United States Patent [19]

Tavss et al.

[11] Patent Number: 4,693,395
[45] Date of Patent: Sep. 15, 1987

[54] ETHYLENE PROPYLENE COPOLYMER IN A SUBSTRATE AND COLLAPSIBLE DISPENSING CONTAINER MADE THEREFROM

[75] Inventors: Edward A. Tavss, Kendall Park; John Santalucia, East Brunswick; David L. Carroll, Piscataway, all of N.J.

[73] Assignee: Colgate-Palmolive Company, New York, N.Y.

[21] Appl. No.: 902,119

[22] Filed: Sep. 2, 1986

Related U.S. Application Data

[63] Continuation of Ser. No. 687,281, Dec. 28, 1984, abandoned.

[51] Int. Cl.$^4$ .............................................. B65D 35/08
[52] U.S. Cl. ....................................... 222/107; 428/35; 428/464; 428/511
[58] Field of Search ............... 428/460, 464, 530, 511, 428/35-36; 222/92, 107, 215; 206/484.2, 524.1-524.3

[56] References Cited

U.S. PATENT DOCUMENTS

| | | | |
|---|---|---|---|
| 3,178,065 | 4/1965 | Awerswald | 222/107 |
| 3,295,725 | 1/1967 | Brandt | 150/55 X |
| 3,347,419 | 10/1967 | Brandt et al. | 222/107 |
| 3,832,964 | 9/1974 | Rockefeller | 222/92 X |
| 3,958,721 | 5/1976 | Kushida et al. | 222/107 |
| 4,096,946 | 6/1978 | Cook et al. | 206/484.2 |
| 4,142,630 | 3/1979 | Hayes et al. | 206/277 |
| 4,207,363 | 6/1980 | Lustig et al. | 428/35 |
| 4,279,344 | 7/1981 | Holloway, Jr. | 206/631 |
| 4,308,084 | 12/1981 | Ohtusuki et al. | 156/233 |
| 4,329,395 | 5/1982 | Pickford | 428/344 |
| 4,405,667 | 9/1983 | Christensen et al. | 428/35 |
| 4,407,874 | 10/1983 | Gehrke | 428/35 |

Primary Examiner—Joseph J. Rolla
Assistant Examiner—Michael S. Huppert
Attorney, Agent, or Firm—Eric P. Schellin

[57] ABSTRACT

There is disclosed a substrate of layers of materials comprising ethylene propylene copolymer layers having sandwiched therein between a metal foil layer and a paper layer all suitably adhered to one another. It is also contemplated that the substrate be employed in fabricating a dentifrice tube.

10 Claims, 2 Drawing Figures

ETHYLENE PROPYLENE COPOLYMER IN A SUBSTRATE AND COLLAPSIBLE DISPENSING CONTAINER MADE THEREFROM

This application is a continuation of application Ser. No. 687,281, filed Dec. 28, 1984 now abandoned.

FIELD OF THE INVENTION

The present invention relates broadly to the container art, and is more particularly concerned with a collapsible dispensing container of laminated wall construction in the body portion thereof, whereby product permeation and absorption, and oxygen absorption are substantially prevented in all regions of the container structure susceptible thereto.

BACKGROUND OF THE INVENTION

Collapsible tubes formed of metallic and plastic materials have long been known in the packaging field. Extruded metal tubes are inherently brittle and repeated use not infrequently results in wall cracks so that product is exuded from a location other than the essentially rigid dispensing orifice. Of the prior art metal tubes, aluminum tubes, while probably being the least brittle, are somewhat limited in their applications since up to the present time it has not been possible to apply to the interior surfaces thereof a completely satisfactory coating, when required to prevent attack and corrosion of the metal by alkaline or acid contents and contamination of the contents by the reaction products. Notwithstanding the relatively brittle nature of a metal tube, the mentioned internal coating operation requires an additional processing step which necessarily increases the cost of the final article.

Tubes formed of polyethylene and other plastic materials have enjoyed wide commercial success in the packaging of many products; however, certain other products after a time have been noted to deteriorate when contained therein. Plastics as exemplified by polyethylene are permeable to a degree when employed in the wall thicknesses used in tubular containers, and the essential oils embodied in most dentifrices for flavoring purposes are reduced in volume during storage of the container, rendering the dentifrice less palatable. Also, the plastic container wall absorbs oxygen over a period of time and ultimately may decompose the product, which has actually been found to be the case with fluoride-containing toothpastes. A further disadvantage of a plastic tube resides in the inability of the surface to readily receive printing or decorative material. In addition, plastic tubes, as exemplified by polyethylene, have a memory effect; that is, they do not remain compressed when squeezed, a particular disadvantage for dentifrice tubes.

To counter the above problems, it has accordingly been proposed to provide a metallic foil barrier between the product and the polyethylene tubre body. This would counter the compressibility problem in that the metal layer would impose its compressibility upon the plastic. In addition, the metallic foil barrier between the product and the polyethylene tube body would prevent the mentioned loss of essential oils and the absorption of oxygen. The metallic barrier has been suggested as an interlayer between facing sheets of polyethylene, and that a laminate be formed by heat with or without suitable adhesives. However, while a structure of this general character is effective to prevent some product permeation and oxygen absorption through the tube body, and particularly when the inner thermoplastic layer is a copolymer of ethylene and a polar group containing monomer which is co-polymerizable therewith, there remains the possibility of product deterioration albeit to a much lesser extent.

PRIOR ART

Attention is directed to the following prior art.

Brandt (U.S. Pat. No. 3,295,725) discloses a tube which combines above advantages of an aluminum tube with advantages of a plastic tube. This is a laminated collapsible dispensing container containing both a metallic barrier and a polyethylene inner wall. The thermoplastic layer is broadly described as polyolefin and a copolymer of an olefin and a polar group containing monomer which is copolymerizable therewith. This laminate overcomes the above described limitations, except for absorption of the essential oils from the dentifrices.

Marchak (Can Pat. No. 728,525) discloses a laminated tube containing an inner layer of polyethylene. He acknowledged the problem of absorption of flavor oil by the thermoplastic wall.

Cook (U.S. Pat. No. 4,096,946) discloses a laminated package using vinylidene chloride as the inner layer, and an outer layer of copolymer of ethylene and propylene. However, this is not a tube; it contains no metal; and Cook did not make mention of the flavor barrier properties of the copolymer.

Anthony (U.S. Pat. No. 4,207,363) discloses a laminate film used for packaging meats which contains a propylene ethylene copolymer as the outer layer. This also is not a tube; it contains no metal; and Anthony made no mention of the copolymer's flavor barrier properties.

In addition, Christensen (U.S. Pat. No. 4,405,667), Ohtusuki (U.S. Pat. No. 4,308,084), and Holloway (U.S. Pat. No. 4,279,344) teach laminated packaging articles containing ethylene propylene copolymer. However, none of these articles were tubes, and no mention was made of the copolymer's flavor barrier properties.

SUMMARY OF THE INVENTION

It is, therefore, an important aim of the present invention to provide a collapsible dispensing container of laminated wall construction in the body portion.

Another object of this invention lies in the provision of a tubular container having a plurality of adherent layers in the body portion thereof, one of said layers providing a barrier to product migration and oxygen absorption such as a metallic foil and another of said layers being ethylene propylene copolymer or mixture thereof varying in density and crystallinity. The latter layer being innermost and preferably outermost with different additional laminae sandwiched therein between.

Such additional layers comprise paper and suitable adhesive and bonding agents such as copolymer of ethylene and acrylic acid. The collapsible dispensing container of the present invention may be constructed from the laminated substrate of the present invention by conventional and known apparatuses. Exemplary of such equipment and method can be discerned from U.S. Pat. No. 3,832,964, which is incorporated herein by reference.

A further object of the instant invention is to provide a method of producing laminated tubes in which a tubular body is formed of a barrier layer and an ethylene propylene copolymer laminated thereto; the laminated tube body is then located on a forming member in adjacency to a barrier member also positioned thereon.

Other objects and advantages of the invention will become more apparent as the description proceeds.

BRIEF DESCRIPTION OF THE DRAWINGS

In the drawings wherein like numerals are employed to designate like parts throughout the same.

DETAILED DESCRIPTION OF THE INVENTION

The thermoplastic of the present invention is ethylene propylene copolymer.

Figure 1:
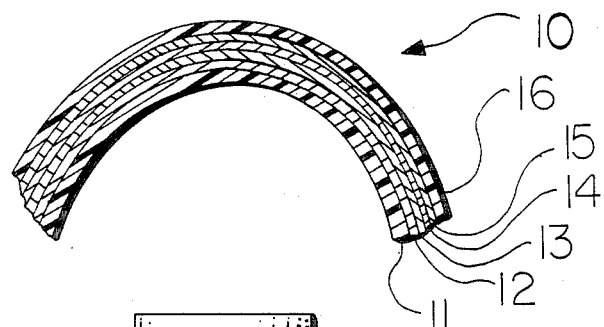
FIG. 1 is a cross-sectional view of a fragmentary portion of a laminated substrate of the present invention.

Referring now first to FIG. 1 of the drawings, a substrate 10 is shown in cross-section whereby to reveal the components of the sandwich that go to make up the laminated configuration.

It will be seen that the bottommost layer 11 is an ethylene propylene copolymer. The second layer 12 thereabove is an adhesive layer which joins the ethylene propylene copolymer layer 11 with third layer 13 which is a metal foil such as aluminum foil. The fourth layer 14 is another adhesive that adhesively secures the other surface of the metal foil layer 13 to a paper layer 15. The topmost layer 16 is ethylene propylene copolymer.

The ethylene propylene copolymer is particularly useful because it has very low flavor absorption characteristics as can be seen from the following tables where ethylene propylene copolymer is compared with polyethylene where the thicknesses of the layers or coating are the same:

TABLE I

| POLYMER ABSORPTION OF NEAT FLAVOR OIL (2 week contact) | |
|---|---|
| Polymer | Weight Increase (%) |
| Aluminum | 0 |
| Ethylene propylene copolymer Rigidex 40 (British Petroleum) | 4.8 |
| Low density polyethylene Tenite 154 (Eastman) | 5.5 |
| Low density polyethylene Lupolen 1804H (BASF) | 5.6 ± 0.14 |
| High density polyethylene LR (USI) | 5.9 |
| Ionomer Surlyn 1707 (Dupont) | 15.7 |
| Ionomer Surlyn 1605 (Dupont) | 19.0 |
| Ionomer Surlyn 1706 (Dupont) | 24.3 |

TABLE II

| Relative Flavor Absorption by Polymers After Contact with Dentifrice for 3 Months* | |
|---|---|
| Polymer | Flavor Absorbed** |
| Ethylene propylene copolymer Rigidex 40 (British Petroleum) | 59 |
| High density polyethylene LR(USI) | 84 |
| Low density polyethylene NA (USI) | 100 ± 13 |

TABLE II-continued

| Relative Flavor Absorption by Polymers After Contact with Dentifrice for 3 Months* | |
|---|---|
| Polymer | Flavor Absorbed** |
| Ionomer Surlyn 1706 | 893 |
| Ionomer Surlyn 1707 | 1557 |
| Ionomer Surlyn 1605 | 1672 |

*At 90° F.
**Relative to low density polyethylene which was arbitrarily set at 100; the lower the number the less flavor absorbed.

It is contemplated that within the purview of the invention the adhesives may be a copolymer of ethylene and acrylic acid or methacrylic acid, or sodium or zinc salts thereof in a diluent system.

The metal foil may be preferably aluminum foil.

The paper layer is desirably a kraft paper.

The thickness range of each of the layers is as follows:

Ethylene propylene copolymer layer 11 0.5 mils to 3.0 mils, preferably 1.0 mils Adhesive layer 12—sufficient to assure adherence Metal foil layer 13—0.5 mils to 2.0 mils, preferably 1.0 mils.

Adhesive layer 14—sufficient to assure adherence

Paper layer 15—1.5 mils to 2.5 mils, preferably 2.0 mils.

Ethylene propylene copolymer layer 16—3.5 mils to 5.0 mils, preferably 4.0 mils.

The topmost ethylene propylene copolymer layer 16 adheres to the paper layer 15 by means of the application of sufficient heat and pressure to the substrate. In the event the application of heat and pressure is not appropriate a suitable adhesive is to be employed.

Figure 2:
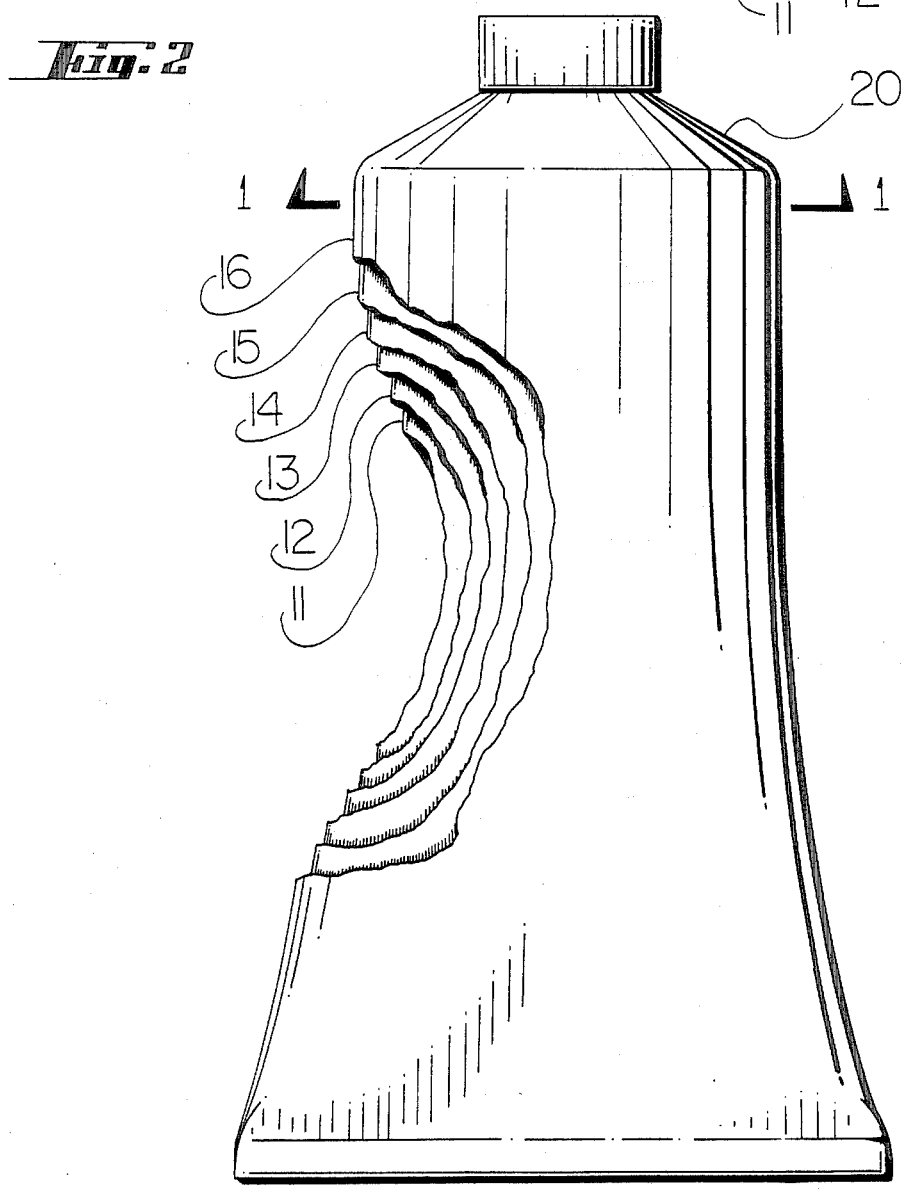
FIG. 2 is a side elevational view of a collapsible dispensing container embodying the novel concepts of this invention, with portions of the body walls being broken away to more fully illustrate the laminated structure.

FIG. 2 is an example of the laminated structure of a collapsible container with the layers being demonstrated as in FIG. 1 with layer 11 being inner most and the other layer being of the same materials and in the same order as shown.

It is believed manifest from the foregoing that applicant has provided a collapsible container structure which substantially reduces the problems heretofore unsolved by the prior art. The laminated substrate and laminated shoulder piece 20 substantially eliminates product permeation and oxygen absorption.

The outer layer of an ethylene propylene copolymer is a thermoplastic capable of fusion during a side seaming step and granting adequate protection to the paper and metallic foil interlayer. The art of seaming of a collapsible dentifrice tube of the general type herein disclosed can be seen in U.S. Pat. No. 3,295,725, incorporated herein by reference.

However, the outer layer of ethylene propylene copolymer and paper may be eliminated if the foil barrier is of sufficient thickness to resist damage, and by flowing a thermoplastic material into the overlap side seam during the sealing thereof when such a system is employed.

Further, the outer layer may be paper in a three-ply laminate formed of paper, foil and an ethylene polypropylene copolymer as described. As the outermost and innermost layers are preferably the same, the folded edges of the tube produced from the substrate is conveniently heat bonded. A suitable adhesive can be used when heat bonding is not possible. This modification is in addition to the aforementioned four-ply laminate comprised of from outside to in, ethylene propylene copolymer, paper, foil and ethylene propylene copolymer. It is contemplated that suitable adhesives will be employed between the laminae whenever necessary.

Ethylene propylene copolymers can also be employed for the shoulder piece, cap, neck, piston and in the construction of dispensing valves for other dentifrice dispensers, particularly in conjunction with the interior portions exposed to the contained dentifrice, and, again, where required, compatible adhesives would naturally be employed.

Additionally when cast as a film on the interior surfaces of fiber drums used for the storage of flavored dentifrice, the material will retard flavor loss into the drums, thereby extending storage life.

Various modifications of the invention have been disclosed herein, and these and other changes can of course be effected without departing from the novel concepts of the instant contribution.

What is claimed is:

1. A substrate of layers of materials having low percentage flavor absorption characteristics of 4.8% comprising a first innermost layer of an ethylene propylene copolymer, a second layer of metal foil, a third layer of paper and a fourth outermost layer of an ethylene propylene copolymer which is thicker than the first layer, and has a thickness ranging from about 3.5 to about 5.0 mils.

2. The substrate of claim 1 wherein the first layer of the ethylene propylene copolymer is secured to the metal foil with an adhesive.

3. The substrate of claim 1 wherein the third layer of paper is secured to the fourth layer of the ethylene propylene copolymer with an adhesive.

4. The substrate of claim 1 wherein the first layer of the ethylene propylene copolymer is secured to the metal foil with an adhesive and wherein the third layer of paper is secured to the fourth layer of the ethylene propylene copolymer with an adhesive.

5. The substrate of claim 4 wherein the adhesive is a copolymer of ethylene and acrylic acid.

6. A collapsible paste dispensing container of layers of material having low percentage flavor absorption characteristics of 4.8% comprising a first innermost layer of an ethylene propylene copolymer, a second layer of metal foil, a third layer of paper and an outermost fourth layer of an ethylene propylene copolymer which is thicker than the first layer, and has a thickness ranging from about 3.5 to about 5.0 mils.

7. The container of claim 6 wherein the first layer of the ethylene propylene copolymer is secured to the metal foil with an adhesive.

8. The container of claim 6 wherein the third layer of paper is secured to the fourth layer of the ethylene propylene copolymer with an adhesive.

9. The container of claim 6 wherein the first layer of the ethylene propylene copolymer is secured to the metal foil with an adhesive and wherein the third layer of paper is secured to the fourth layer of the ethylene propylene copolymer with an adhesive.

10. The container of claim 9 wherein the adhesive is a copolymer of ethylene and acrylic acid.

* * * * *